(12) United States Patent
Lazzaro et al.

(10) Patent No.: US 8,999,188 B2
(45) Date of Patent: Apr. 7, 2015

(54) COMPOSITION FOR APPLICATION AS A FLOTATION FROTHER

(75) Inventors: Salvatore Lazzaro, Taylors Lakes (AU);
Andrew Smethurst, Keilor (AU);
Rodney Walter Parr, Doncaster (AU);
Lubos Sadek, Eltham (AU); Jason Sukbeom Hong, East Killara (AU)

(73) Assignee: Huntsman Corporation Australia Pty Limited, Brooklyn (AU)

( * ) Notice: Subject to any disclaimer, the term of this patent is extended or adjusted under 35 U.S.C. 154(b) by 195 days.

(21) Appl. No.: 13/822,319

(22) PCT Filed: Sep. 26, 2011

(86) PCT No.: PCT/AU2011/001234
§ 371 (c)(1),
(2), (4) Date: Apr. 2, 2013

(87) PCT Pub. No.: WO2012/040773
PCT Pub. Date: Apr. 5, 2012

(65) Prior Publication Data
US 2013/0270475 A1    Oct. 17, 2013

Related U.S. Application Data

(60) Provisional application No. 61/386,643, filed on Sep. 27, 2010.

(51) Int. Cl.
*B03D 1/004*    (2006.01)
*B03D 1/02*    (2006.01)
*B03D 103/08*    (2006.01)
*C02F 1/24*    (2006.01)
*B03D 1/008*    (2006.01)

(52) U.S. Cl.
CPC ............ *B03D 1/008* (2013.01); *B03D 2201/02* (2013.01); *B03D 2203/08* (2013.01); *C02F 1/24* (2013.01); *B03D 1/02* (2013.01)

(58) Field of Classification Search
USPC ........................................... 252/61; 209/166
See application file for complete search history.

(56) References Cited

U.S. PATENT DOCUMENTS

| 4,582,596 | A | * | 4/1986 | Hansen et al. | ................ 209/166 |
| 4,761,223 | A | * | 8/1988 | Klimpel et al. | ................ 209/166 |
| 4,967,016 | A | | 10/1990 | Kemp | |
| 5,162,589 | A | | 11/1992 | Wijngaarden et al. | |
| 5,705,476 | A | | 1/1998 | Hoffarth | |
| 5,844,115 | A | | 12/1998 | Moody et al. | |
| 2006/0239876 | A1 | | 10/2006 | Leeming et al. | |

* cited by examiner

*Primary Examiner* — Carol M Koslow
(74) *Attorney, Agent, or Firm* — Huntsman International LLC

(57) ABSTRACT

The present disclosure provides a froth flotation composition including a cycloaliphatic alcohol and a reaction product of the cycloaliphatic alcohol and propylene oxide. The froth flotation composition is especially suited for use in ore and coal flotation processes.

18 Claims, No Drawings

COMPOSITION FOR APPLICATION AS A FLOTATION FROTHER

CROSS-REFERENCE TO RELATED APPLICATIONS

This application is the National Phase of International Application PCT/AU2011/001234 filed Sep. 26, 2011 which designated the U.S. and which claims priority to U.S. Application Ser. No. 61/386,643 filed Sep. 27, 2010. The noted applications are incorporated herein by reference.

STATEMENT REGARDING FEDERALLY SPONSORED RESEARCH OR DEVELOPMENT

Not Applicable.

FIELD OF INVENTION

This disclosure relates to a novel froth flotation composition and to a method for its preparation and use. The froth flotation composition is particularly useful as a foaming or frothing agent in a variety of flotation-based processes including ore and coal flotation, as well as other industrial flotation-based processes.

BACKGROUND OF THE INVENTION

Froth flotation is a widely used process for selectively separating hydrophobic materials from non-hydrophobic materials in a mixture. It is particularly useful in separating fine solids from other solids in a liquid mixture by the selective attachment of hydrophobic solid particles to gas bubbles contained in the liquid mixture. Most often the gas used is air, which has been passed through the liquid mixture at such a rate to provide a sustained "froth" or accumulation of bubbles at the liquid-surface interface. The density difference between the gas bubbles and liquid provides the attached hydrophobic solid particles with buoyancy lifting these particles to the surface and leaving the non-hydrophobic solid particles behind in the bulk liquid mixture. The hydrophobic solid particles at the surface may then be separated from the bulk liquid mixture by draining the bulk liquid mixture or by mechanically skimming the surface.

In order to enhance separating efficiency, a "frother" or "frothing agent" is used to stabilize the gas bubbles carrying the hydrophobic solid particles to the surface. Frother's typically contain both polar and non-polar components. The non-polar or hydrophobic moiety will orient itself into the air phase while the polar or hydrophilic moiety will tend to orient itself into the liquid phase. The result is enhanced bubble wall strength and stability due to a localized increase in surface tension which allows the bubbles to hold and concentrate the desired hydrophobic material.

Effective frothers usually contain at least five (5) carbon atoms in a straight or branched chain configuration. Examples include 2-ethyl-3-hexanol, cyclic alcohols (for example pine oil), 1,1,3-triethoxy butane and polyalkylene glycols.

One of the most commonly used frothers is 4-methyl-2-pentanol or "MIBC". MIBC, which displays excellent surface behavior and solubility, has been widely adopted in coal, metal and non-metal flotation processes due to its relatively low cost and good performance, especially in applications where minerals are relatively hydrophobic and readily floatable. However, MIBC is highly flammable, and therefore requires special care when being handled, transported and stored in large volumes. Accordingly, it is highly desirable to develop alternative frothers having improved flammability characteristics which can be used in place of MIBC in flotation processes in various industries, such as in the coal, mining, chemical, sewage and waste treatment industries.

SUMMARY OF THE INVENTION

The present disclosure provides a froth flotation composition containing:
(a) a cycloaliphatic alcohol; and
(b) a reaction product of the cycloaliphatic alcohol (a) and propylene oxide.

The present disclosure also provides methods for using the froth flotation composition in a variety of mineral processing applications, for example, in the beneficiation of metal sulphide ores, coal and industrial mineral sands and also in dissolved air flotation separation processes.

DETAILED DESCRIPTION OF THE INVENTION

In general, the present disclosure provides a froth flotation composition including: (a) a cycloaliphatic alcohol; and (b) a reaction product of the cycloaliphatic alcohol (a) and propylene oxide. It has been surprisingly found that the froth flotation composition of the present disclosure, when used in a flotation process, improves metal recovery and selectivity at lower dosage amounts as compared to conventional frothers. In addition, the froth flotation composition of the present disclosure is non-flammable providing advantages in terms of safety and handling. Accordingly, the froth flotation composition is particularly suitable for use in various mining and industrial processing applications, for example, in the beneficiation of coal and ores, for example, metal sulphide ores based on copper, lead, zinc, gold, silver, iron, uranium, molybdenum, arsenic, antimony, cobalt and platinum group metals, floatable metal oxides, industrial minerals such as phosphates, mineral sands, silicates and carbonates, and in dissolved air flotation separation processes.

Thus, according to an embodiment, the froth flotation composition of the present disclosure includes a cycloaliphatic alcohol. The term "cycloaliphatic" as used herein refers to a radical group having a valence of at least 1 and comprising an array of atoms which is cyclic, but which is not aromatic.

In one embodiment, the cycloaliphatic alcohol is a monofunctional alcohol of the formula (I)

$$R\text{—}OH \qquad (I)$$

where R is a cycloaliphatic radical group having from 3-20 carbon atoms, preferably from 3-8 carbon atoms. Examples of R groups include, but are not limited to, cyclopropyl, cyclobutyl, cyclohexyl, cyclooctyl, cyclodecyl, cyclododecyl and the different isomers of methylcyclohexyl, dimethylcyclohexyl, trimethylcycohexyl and t-butylcyclohexyl. Preferably, R is cyclohexyl.

In certain embodiments, the froth flotation composition may contain at least about 15% by weight, preferably at least about 17.5% by weight, and even more preferably at least about 20% by weight of the cycloaliphatic alcohol, where the % by weight is based on the total weight of the froth flotation composition. In other embodiments, the froth flotation composition may contain less than about 65% by weight, preferably less than about 60% by weight, and even more preferably less than about 50% by weight of the cycloaliphatic alcohol, where the % by weight is based on the total weight of the froth flotation composition. In still other embodiments, the froth flotation may contain at least about 15% by weight and less than about 65% by weight, preferably at least about 17.5% by weight and less than about 60% by weight, and even more preferably at least about 20% by weight and less than about 50% by weight of the cycloaliphatic alcohol, where the % by weight is based on the total weight of the froth flotation composition.

The froth flotation composition of the present disclosure also includes a reaction product of the cycloaliphatic alcohol described above and propylene oxide.

In one embodiment, the reaction product comprises at least one compound of the formula (II)

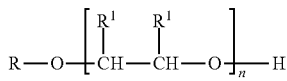

where R is defined as above, $R^1$ is independently hydrogen or methyl and n is an integer greater than or equal to 1; with the proviso that in each ether unit one $R^1$ must be methyl while the other $R^1$ must be hydrogen.

In another embodiment, the reaction product comprises a compound of the formula (III)

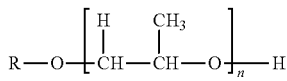

and/or a compound of the formula (IV)

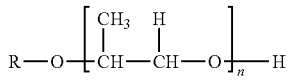

where R is defined as above and n is an integer from 1 to 10.

In still another embodiment, the reaction product comprises a compound of the formula (V)

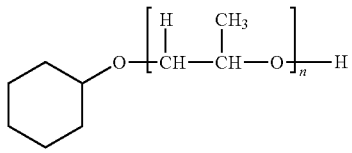

and/or a compound of the formula (VI)

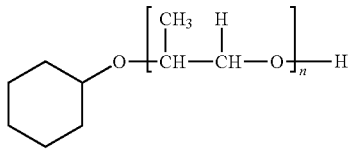

where n is an integer from 1 to 10, preferably from 1-5.

In certain embodiments, the froth flotation composition may contain at least about 30% by weight, preferably at least about 40% by weight, and even more preferably at least about 50% by weight of the reaction product, where the % by weight is based on the total weight of the froth flotation composition. In other embodiments, the froth flotation composition may contain less than about 85% by weight, preferably less than about 80% by weight, and even more preferably less than about 70% by weight of the reaction product, where the % by weight is based on the total weight of the froth flotation composition. In still other embodiments, the froth flotation may contain at least about 30% by weight and less than about 85% by weight, preferably at least about 40% by weight and less than about 80% by weight, and even more preferably at least about 50% by weight and less than about 70% by weight of the reaction product, where the % by weight is based on the total weight of the froth flotation composition.

The reaction product of the present disclosure can be prepared by contacting the cycloaliphatic alcohol with the appropriate molar amount of propylene oxide in the presence of a catalyst in a reaction vessel to form at least one compound of the formula (II). The desired compound(s) may be obtained by controlling the degree of propoxylation of the cycloaliphatic alcohol and removal by distillation. As one skilled in the art is aware, the degree of propoxylation may be controlled by the reaction conditions employed and the catalyst used. For example, a lower degree of propoxylation can be achieved by reacting an amount of cycloaliphatic alcohol which is in molar excess with respect to the amount of propylene oxide (e.g. the ratio of propylene oxide to cycloaliphatic alcohol is kept below 70%) while a higher degree of propoxylation can be achieved by reacting an amount of propylene oxide which is in molar excess with respect to the amount cycloaliphatic alcohol.

The catalyst used in the propoxylation may either be an acid catalyst, base catalyst or narrow range ethoxylation (NRE) catalyst. Acid catalysts include Lewis acids, such as boron trifluoride, antimony pentachloride, tin (IV) chloride, and aluminium alkylates, or Bronsted acids, such as, p-toluene, sulphonic acid, fluorosulfonic acid and perchloric acid. Base catalysts include those derived from alkali and alkaline earth metals, for example, alkaline metal hydroxides, such as lithium, sodium or potassium hydroxide. NRE's which are useful in generating a narrow molecular weight range of propoxylated products are well known to those experienced in the art, including those taught in U.S. Pat. Nos. 4,967,016, 5,162,589, and 5,844,115, the entire contents of which are hereby incorporated by reference.

Optionally, the froth flotation composition may be blended with one or more other known additives prior to or during its final use depending on the requirements of the application. Examples of such additives include, but are not limited to: conventional frothers (e.g. alcohols, polyglycols, other alkoxylates); collectors (e.g. diesel oil, kerosene, dithiophosphates, thionocarbamates, xanthates, organic acids and their corresponding salts, amines and ammonium salts); dispersants; depressants; neutralizing agents; and water or other solvents.

The froth flotation composition of the present disclosure may be prepared in known manner, for example, by mixing the components together in any order using customary devices, such as a stirred vessel, stirring rod, ball mill, sample mixer, static mixer or ribbon blender. Once formulated, the froth flotation composition may be packaged in a variety of containers such as steel, tin, aluminium, plastic or glass containers.

The froth flotation composition may be used in existing froth flotation processes. For example, the froth flotation composition may be used in a ore or coal flotation process as follows:

1. The froth flotation composition is added to either a conditioning vessel prior to flotation or to the first flotation cell directly, depending on the amount of time and agitation, required to disperse it within the ore/coal slurry. In the case of Jameson® cells, the froth flotation composition is added to the downcomer portion of the cell to optimize dispersion within the high shear environment.
2. Once in the flotation cells, the froth flotation composition acts to facilitate the generation of a stabilized froth to aid in the recovery of fine particles. The desired mineral or coal particles are concentrated through attachment of these particles to the stable air bubbles which rise to the top of the cell. Other reagents can assist with selective collection of the desired mineral or coal particles, and depression of unwanted gangues or other minerals.
3. The mineral/coal enriched froth concentrate is then collected from the top of the cell either passively by over spilling into collection launders or by mechanical skimming.
4. The mineral/coal enriched froth concentrate may then be subjected to further flotation cleaning to further enhance the selectivity of desired mineral/coal. Further flotation may or may not require additional froth flotation composition dosing.
5. The final concentrate is typically collected and thickened/dried before further processing.

Thus, the froth flotation composition is useful in the recovery of clean coal and in the recovery and concentration of desirable minerals or selective removal of undesirable minerals by flotation. In addition, the froth flotation composition may also be used in other industrial flotation processes, for example, in industrial sewage and waste water treatment processes, or in paper recycling processes.

EXAMPLES

In a laboratory flotation study conducted on a representative Lead/Zinc bearing ore, the present inventive froth flotation composition was tested for metallurgical performance and efficiency against a standard MIBC baseline. Results of the study demonstrated that the inventive froth flotation composition was able to give enhanced recovery of Lead (~4%) and Zinc (~2%) when compared to MIBC at no detriment to concentrate grade. In addition this was achieved at substantially (~20%) lower reagent dose than MIBC. This improvement in metallurgical performance and reduced reagent consumption could represent a substantial benefit to any operation where this could be applied.

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the disclosure, and do not delimit the scope of the disclosure.

What is claimed is:
1. A froth flotation composition comprising:
   (a) a cycloaliphatic alcohol; and
   (b) a reaction product of the cycloaliphatic alcohol (a) and propylene oxide.
2. The froth flotation composition according to claim 1, wherein the cycloaliphatic alcohol is a monofunctional alcohol of the formula (I)

$$R\text{—}OH \quad (I)$$

where R is a cycloaliphatic radical group having from 3-20 carbon atoms.

3. The froth flotation composition according to claim 1, wherein the reaction product comprises at least one compound of the formula (II)

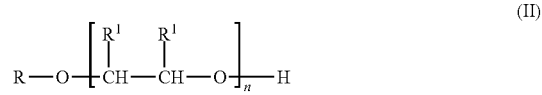

where R is defined as above, $R^1$ is independently hydrogen or methyl and n is an integer greater than or equal to 1; with the proviso that in each ether unit one $R^1$ must be methyl while the other $R^1$ must be hydrogen.

4. The froth flotation composition according to claim 3, wherein the reaction product comprises a compound of the formula (V)

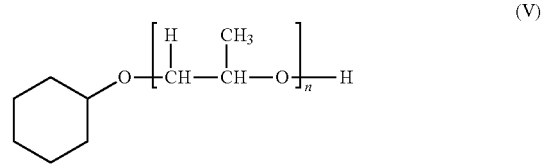

and/or a compound of the formula (VI)

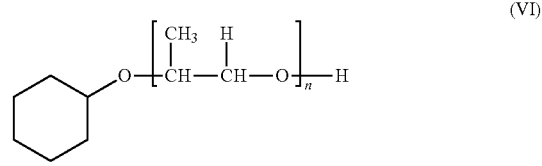

where n is an integer from 1 to 10.

5. The froth flotation composition according to claim 1 further comprising one or more additives.

6. The froth flotation composition according to claim 1, wherein a weight of the cycloaliphatic alcohol is between about 15% and 65% of the total weight of the froth flotation composition.

7. The froth flotation composition according to claim 1, wherein a weight of the reaction product is between about 30% and 85% of the total weight of the froth flotation composition.

8. The froth flotation composition according to claim 2, wherein R in the formula (I) is a cycloaliphatic radical group having from 3-8 carbon atoms.

9. The froth flotation composition according to claim 1, wherein the cycloaliphatic alcohol is a monofunctional alcohol having a formula:

$$R\text{—}OH$$

where R is cyclopropyl, cyclobutyl, cyclohexyl, cyclooctyl, cyclodecyl, cyclododecyl, or different isomers of methylcyclohexyl, dimethylcyclohexyl, trimethylcyclohexyl and t-butylcyclohexyl.

10. The froth flotation composition according to claim 4, wherein n is an integer from 1 to 5.

11. The froth flotation composition according to claim 2, wherein the reaction product comprises at least one compound of the formula (II)

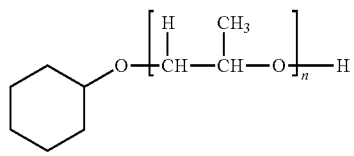
(II)

where R is defined as above, $R^1$ is independently hydrogen or methyl and n is an integer greater than or equal to 1; with the proviso that in each ether unit one $R^1$ must be methyl while the other $R^1$ must be hydrogen.

12. The froth flotation composition according to claim 11, wherein the reaction product comprises a compound of the formula (V)

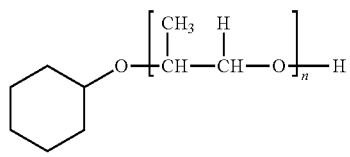
(V)

and/or a compound of the formula (VI)

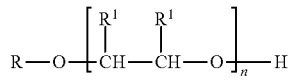
(VI)

where n is an integer from 1 to 10.

13. A method of recovering particles from a slurry, comprising:
adding a froth flotation composition to a slurry containing particles, wherein the froth flotation composition comprises:
a cycloaliphatic alcohol; and
a reaction product of the cycloaliphatic alcohol and propylene oxide;
forming a froth containing the particles; and
collecting the froth containing the articles.

14. The method of claim 13, wherein the particles are clean coal particles.

15. The method of claim 13, wherein the particles are mineral particles.

16. The method of claim 13, wherein the cycloaliphatic alcohol is a monofunctional alcohol of the formula (I)

R—OH  (I)

where R is a cycloaliphatic radical group having from 3-20 carbon atoms, and wherein the reaction product comprises at least one compound of the formula (II)

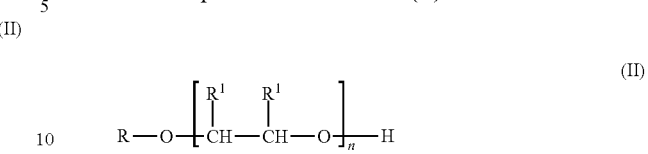
(II)

where R is defined as above, $R^1$ is independently hydrogen or methyl and n is an integer greater than or equal to 1; with the proviso that in each ether unit one $R^1$ must be methyl while the other $R^1$ must be hydrogen.

17. The method of claim 13, wherein the reaction product comprises at least one compound of the formula (II)

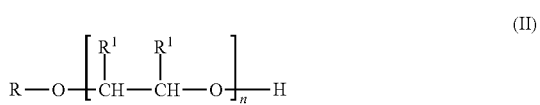
(II)

where R is defined as above, $R^1$ is independently hydrogen or methyl and n is an integer greater than or equal to 1; with the proviso that in each ether unit one $R^1$ must be methyl while the other $R^1$ must be hydrogen.

18. The method of claim 17, wherein the reaction product comprises a compound of the formula (V)

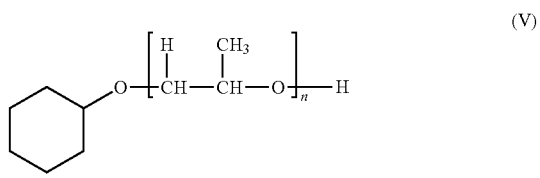
(V)

and/or a compound of the formula (VI)

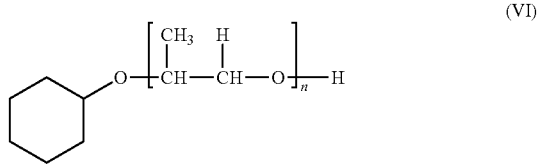
(VI)

where n is an integer from 1 to 10.

* * * * *